US012081512B2

(12) United States Patent
Woodworth et al.

(10) Patent No.: US 12,081,512 B2
(45) Date of Patent: *Sep. 3, 2024

(54) COLLECTING PASSIVE DNS TRAFFIC TO GENERATE A VIRTUAL AUTHORITATIVE DNS SERVER

(71) Applicant: Level 3 Communications, LLC, Broomfield, CO (US)

(72) Inventors: John R. Woodworth, Amissville, VA (US); Dean Ballew, Sterling, VA (US); Mark Dehus, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,711

(22) Filed: Jun. 1, 2023

(65) Prior Publication Data

US 2023/0308414 A1    Sep. 28, 2023

Related U.S. Application Data

(63) Continuation of application No. 17/479,685, filed on Sep. 20, 2021, now Pat. No. 11,677,714.

(60) Provisional application No. 63/101,241, filed on Sep. 21, 2020.

(51) Int. Cl.
*G06F 11/34* (2006.01)
*H04L 61/301* (2022.01)
*H04L 61/4511* (2022.01)
*H04L 61/58* (2022.01)

(52) U.S. Cl.
CPC ........ *H04L 61/4511* (2022.05); *H04L 61/301* (2013.01); *H04L 61/58* (2022.05)

(58) Field of Classification Search
CPC ..... H04L 61/4511; H04L 61/58; H04L 61/301
USPC ........................................................ 709/245
See application file for complete search history.

(56) References Cited

U.S. PATENT DOCUMENTS

| 9,736,185 | B1 * | 8/2017 | Belamaric | H04L 63/20 |
| 11,444,931 | B1 * | 9/2022 | Quevedo | H04L 63/1458 |
| 2017/0019371 | A1 * | 1/2017 | Osterweil | H04L 67/568 |
| 2018/0343122 | A1 * | 11/2018 | Spacek | H04L 9/3247 |
| 2022/0094661 | A1 | 3/2022 | Woodworth | |

* cited by examiner

*Primary Examiner* — Lan Dai T Truong (57) ABSTRACT

The present application describes a system and method for passively collecting DNS traffic data as that data is passed between a recursive DNS resolver and an authoritative DNS server. The information contained in the collected DNS traffic data is used to generate a virtual authoritative DNS server, or a zone associated with the authoritative DNS server, when it is determined that the authoritative DNS server has been compromised.

8 Claims, 5 Drawing Sheets

COLLECTING PASSIVE DNS TRAFFIC TO GENERATE A VIRTUAL AUTHORITATIVE DNS SERVER

BACKGROUND

The Domain Name System (DNS) is used to convert a domain name to an internet protocol (IP) address, thereby allowing a browser of a computing device to access resources and information provided by a webpage associated with the domain name. However, if a DNS record associated with the webpage is modified, the browser of the computing device may be directed to a nefarious site or may be unable to access the resources and information.

SUMMARY

The present application describes systems and methods for passively collecting DNS traffic data as the DNS traffic data is passed between recursive DNS resolver(s) (associated with a first entity) and an authoritative DNS server (associated with a second entity). The information contained in the collected DNS traffic data is used to generate a virtual authoritative DNS server (or a zone associated with the authoritative DNS server) when it is determined that the authoritative DNS server has been compromised.

Accordingly, the present application describes a method comprising capturing DNS data and receiving a trigger notification. The trigger notification indicates that a zone associated with an authoritative DNS server is compromised. A determination is made as to whether a recursive DNS resolver has valid cached information associated with the zone. When it is determined the recursive DNS resolver does not have valid cached information associated with the zone, the recursive DNS resolver retrieves last known valid information associated with the zone from an observer system. The last known valid information having been captured from the DNS data. A virtual zone is generated using the last known valid information and the recursive DNS resolver hosts the virtual zone.

Also described is a method that includes passively capturing DNS data. In response to detecting a trigger event associated with an authoritative DNS server, a determination is made as to whether a recursive DNS resolver has valid cached information associated with the authoritative DNS server. When it is determined that the recursive DNS resolver does not have valid cached information associated with the zone, the recursive DNS resolver retrieves last known valid information associated with the zone from an observer system. The last known valid information is associated with the passively captured DNS data. The recursive DNS resolver uses the passively captured DNS data to provide an answer to a query received from a remote computing device.

The present application also describes a system comprising a recursive DNS resolver and an observer system. The observer system passively captures DNS data associated with a communication between the recursive DNS resolver and an authoritative DNS server. The observer system also monitors the passively captured DNS data and provides instructions to the recursive DNS resolver that causes the recursive DNS resolver to host a generated virtual zone that includes last known valid zone information of a zone associated with the authoritative DNS server. In an example, the generated virtual zone is associated with the zone.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Each website on the Internet is hosted by a server and is identified using an Internet protocol (IP) address. However, instead of requiring an individual to input a particular IP addresses into a browser to access a particular website, the individual may simply input a domain name (e.g., www.example.com) to access the particular website.

When an individual inputs the domain name into her browser on a client computing device, the browser may connect to a recursive DNS resolver operating on a server of a provider network. The recursive DNS resolver may have the IP address associated with the domain name stored in a cache. In such an example, the recursive DNS resolver provides the cached IP address to the requesting computing device and the computing device accesses the requested domain.

If the recursive DNS resolver does not have the IP address associated with the domain in its cache, the recursive DNS resolver requests this information from an authoritative DNS server. In examples, the authoritative DNS server may be owned, controlled, and/or operated by a third party separate from the provider that operates or controls the recursive DNS resolver(s). The authoritative DNS server stores a list of domain names and IP addresses associated with those domain names. Thus, when the authoritative DNS server receives a request from the recursive DNS resolver, the authoritative DNS server responds to the request by providing an address record (A record), an AAAA record, a Canonical Name Record (CNAME), etc. that includes information regarding the IP address that is assigned to the particular domain name. The recursive DNS resolver sends that information back to the requesting client computing device, and the computing device uses the IP address to access the requested domain.

However, in some examples, the authoritative DNS server may be accessed/hacked by malicious individuals/programs that may modify one or more records stored by the authoritative DNS server. For example, an A record associated with a particular zone of the authoritative DNS server may be accessed by an unauthorized actor, and the corresponding the IP address may be altered. As such, instead of directing the requesting client computing device to a legitimate server associated with the requested domain, the computing device is directed to an IP address associated with a malicious server.

In order to combat the above, the present application describes a process and system that passively collects DNS traffic data as the DNS traffic data is received by the recursive DNS resolver(s) and/or transmitted between the recursive DNS resolver(s) and an authoritative DNS server. When the system detects or otherwise determines that the authoritative DNS server has been compromised, the collected DNS traffic data is used to generate a virtual authoritative DNS server (or a virtual zone of the authoritative DNS server). The virtual authoritative DNS server may be hosted by one or more of the recursive DNS resolver(s). This enables the recursive DNS resolver(s) to provide the IP address associated with the legitimate server to the requesting computing device. In another example, the recursive DNS resolver(s) may use the information in the collected DNS data to temporarily act as an authoritative DNS server and/or otherwise provide the IP address associated with the legitimate server to the requesting computing device.

These and other examples will be described in more detail with respect to FIG. 1-FIG. 3.

Figure 1:
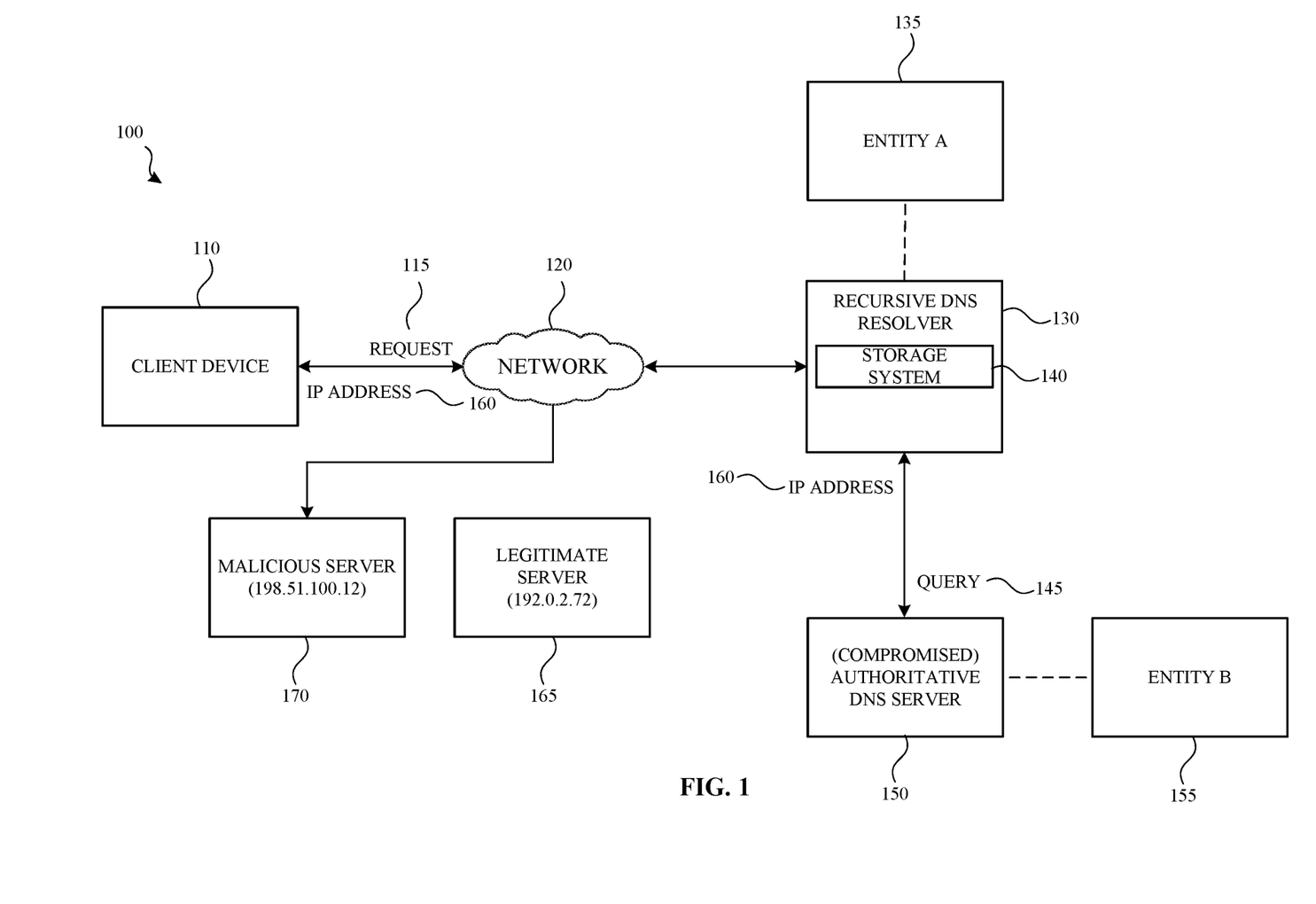
FIG. 1 illustrates an example system in which an authoritative DNS server has been compromised according to an example.

FIG. 1 illustrates an example system 100 in which an authoritative DNS server 150 (or a zone associated with the authoritative DNS server 150) has been compromised according to an example. The system 100 may include a client device 110 that submits a request 115 to a recursive DNS resolver 130 via a network 120. The client device 110 may be any type of computing device including, but not limited to, a mobile phone, desktop computer, laptop computer, gaming device, tablet and so on.

The request 115 may be a request for a particular website such as, for example, www.example.com. When the request 115 is received by the recursive DNS resolver 130, the recursive DNS resolver 130 determines whether the request 115 can be resolved with information that is stored in a storage system 140 associated with the recursive DNS resolver 130. In an example, the storage system 140 is a cache.

If the request 115 can be resolved with information in the storage system 140 and if the recursive DNS resolver 130 determines that information (e.g., IP address) contained in an answer to the request 115 is valid (e.g., has not expired), the recursive DNS resolver 130 provides an IP address 160 associated with www.example.com back to the client device 110. In examples in which the recursive DNS resolver 130 does not have an answer to the request 115 in the storage system 140 and/or the recursive DNS resolver 130 cannot determine whether the information in the answer is valid, the recursive DNS resolver 130 submits a query 145 to the authoritative DNS server 150.

When the query 145 is received, the authoritative DNS server 150 looks up DNS data for the requested domain. The DNS data (e.g., the IP address 160) is associated with a zone. Once the IP address 160 for the requested domain is determined, the authoritative DNS server 150 provides an answer (shown as IP address 160) to the query 145 to the recursive DNS resolver 130. The IP address 160, or other such identifying information, may be contained in an A record, CNAME or an AAAA record. The recursive DNS resolver 130 provides the IP address 160 to the client device 110 via the network 120. The recursive DNS resolver may also store the A record, CNAME and/or the AAAA record in the storage system 140 for subsequent lookups.

In an example, the recursive DNS resolver 130 is owned by or is otherwise associated with a first entity (e.g., Entity A 135) and the authoritative DNS server 150 is owned by or is otherwise associated with a second entity (e.g., Entity B 155). However, the recursive DNS resolver 130 and the authoritative DNS server may share information back and forth such as public encryption keys and other such information.

In the example shown in FIG. 1, the authoritative DNS server 150 has been compromised. For example, an A record and/or a zone associated with a particular domain (e.g., www.example.com) has been modified to return an IP address of 198.51.100.12 that is associated with a malicious server 170 instead of the IP address of 192.0.2.72 that is associated with a legitimate server 165. In this example, when the client device 110 receives the IP address of 198.51.100.12, the client device 110 accesses the malicious server 170 instead of the legitimate server 165. The malicious server 170 then executes an intended attack against the client device 110 or otherwise provides unauthorized information to client device 110.

In order to avoid the scenario described above (or similar scenarios), the present application describes an observer system that: 1) passively captures DNS data as various requests and responses are routed through one or more recursive DNS resolvers, 2) detects whether an authoritative DNS server (or a zone associated with the authoritative DNS server) has been compromised (or whether a chain of trust between zones of the authoritative DNS server has been compromised), and 3) causes the recursive DNS resolver to temporarily act as an authoritative DNS server and return a last known and/or valid A record, AAAA record, CNAME etc. passively collected and/or stored by the observer system and associated with a domain to a requesting client device.

Figure 2A:
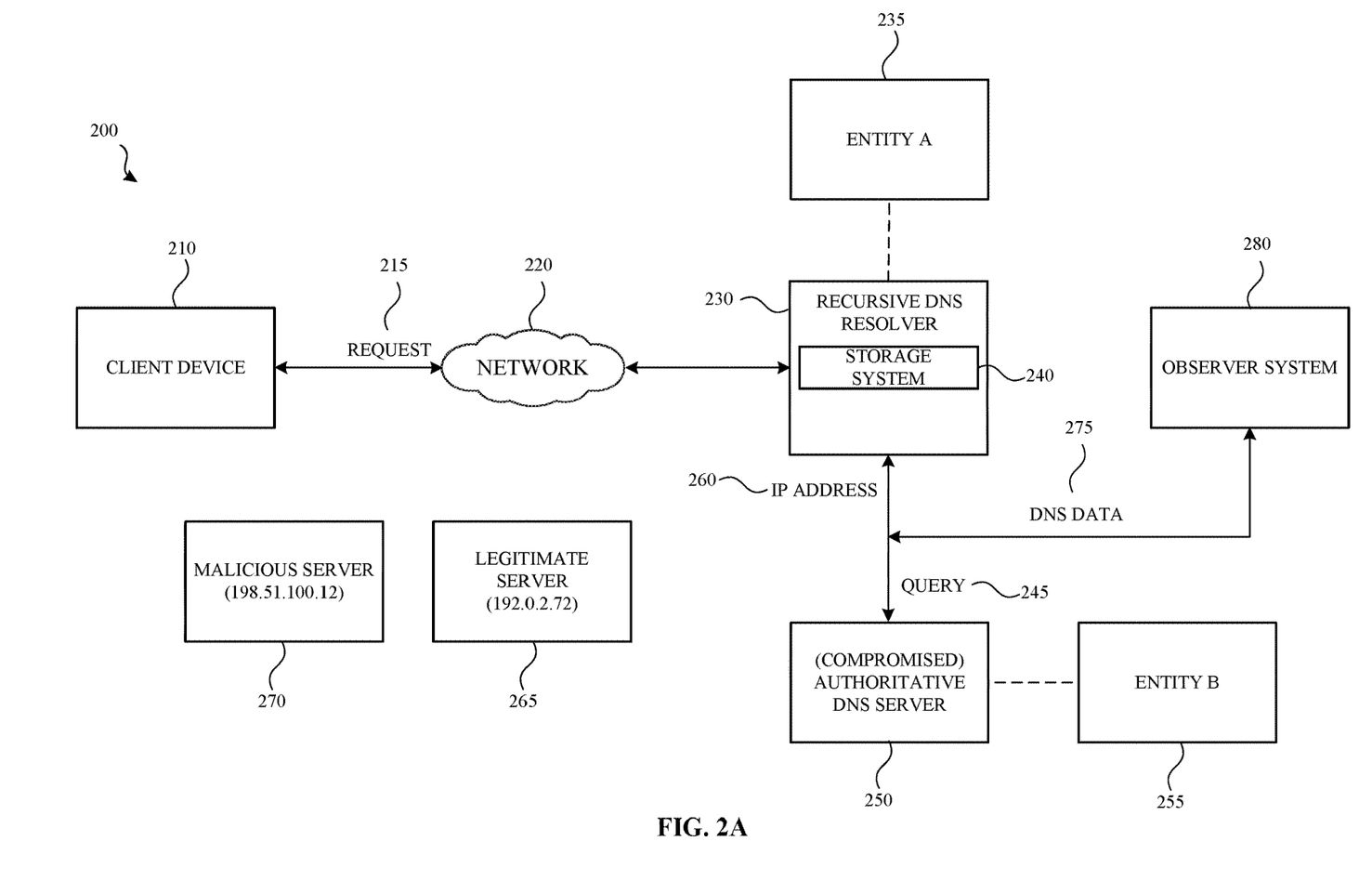
FIG. 2A illustrates an example system for detecting whether an authoritative DNS server has been compromised according to an example.

Accordingly, FIG. 2A illustrates an example system 200 for detecting whether an authoritative DNS server 250 has been compromised according to an example. The various components and systems shown in system 200 are similar to the components and systems shown and described in FIG. 1. However, the system 200 also includes an observer system 280 that monitors and collects DNS traffic such as briefly described above. In examples, the observer system 280 is a server that is controlled by Entity A 235, which also controls the recursive DNS resolver(s) 230.

The system 200 includes a client device 210 that submits a request 215 to a recursive DNS resolver 230 via a network 220. In an example, the recursive DNS resolver 230 is associated with a first entity, such as, for example, Entity A 235.

Although one client device 210 is shown, the system 200 may include any number of client devices 210. Additionally, although one recursive DNS resolver 230, one authoritative DNS server 250 and one observer system 280 is shown, the system 200 may include any number of recursive DNS resolvers 230, authoritative DNS servers 250 and/or observer systems 280.

The request 215 may be a request for a particular website such as, for example, www.example.com. When the request 215 is received by the recursive DNS resolver 230, the recursive DNS resolver 230 may determine whether the request 215 can be resolved with information stored in a storage system 240 (e.g., a cache) associated with the recursive DNS resolver 230.

If the request 215 can be resolved with information in the storage system 240, the recursive DNS resolver 230 provides the IP address 260 (e.g., 192.0.2.72) associated with www.example.com back to the client device 210. As a result, the client device 210 accesses the legitimate server 265.

In examples in which the recursive DNS resolver 230 does not have an answer to the request 215 (and/or the recursive DNS resolver 230 cannot determine whether the information stored in the storage system 240 is valid), the recursive DNS resolver 230 submits a query 245 to the authoritative DNS server 250. In an example, the authoritative DNS server is associated with a second entity, such as, for example, Entity B 255.

The observer system 280 monitors and/or collects DNS data 275 as questions (e.g., query 245) and answers (e.g., IP address 260) are passed between the recursive DNS resolver 230 and the authoritative DNS server 250. A response to a query 245 received by the authoritative DNS server 250 may include public key information, a source associated with the query 245, a destination association with the IP address 260, different types of DNS records (e.g., A records, AAAA records, CNAME) as well as the information contained in those records, upstream servers, names of various servers and the like.

As described above, although a single recursive DNS resolver 230 and a single authoritative DNS server 250 are shown, the observer system 280 may collect DNS data 275 from a number of different recursive DNS resolvers and a number of different authoritative DNS servers. The DNS data 275, the recursive DNS resolver(s) 230 and/or the authoritative DNS server(s) 250 may be specific to one or more geographic areas or regions. In such an example, a particular answer to a query may be specific to a region from which the request 215 originated. Once the geographic area is determined, internet traffic may be directed to servers closer to those geographic areas. However, regardless of the number of different recursive DNS resolvers, the number of different authoritative DNS servers and/or the determined/identified geographic areas associated with received requests 215, the observer system 280 (or multiple observer systems 280) collects and stores all of this information in order to accurately determine whether the authoritative DNS server 250 has been compromised.

For example, when a query 245 is received by the authoritative DNS server 250, the authoritative DNS server 250 looks up DNS data for the domain associated with the original request 215. The DNS data (e.g., the IP address 260) is associated with a zone. This information is provided to the recursive DNS resolver 230. However, as this information is passed between the recursive DNS resolver 230 and the authoritative DNS server 250, the observer system 280 collects this information (represented as DNS data 275). In examples, the observer system 280 uses this information to determine whether the authoritative DNS server 250 (or a zone associated with the DNS server 250) has been compromised. In other examples, observer system 280 may be directly alerted by an operator of Entity B 255, by the authoritative DNS server 250, or otherwise.

The authoritative DNS server 250 may be compromised when data associated with a particular zone of the authoritative DNS server has changed. For example, the observer system 280 may detect or otherwise determine the authoritative DNS server 250 has been compromised based on changes to information contained in one or more records (e.g., A records) associated with a particular zone and/or answer. The observer system 280 may determine that the authoritative DNS server 250 has been compromised if information in a first A record associated with a first answer of a particular query is different from information in a second A record associated with a second answer of a similar query (e.g., the first A record contained a first IP address and the second A record contained a different IP address). In examples, when a change in records for a particular zone/domain is detected, the observer system 280 may initiate a workflow to determine whether the change was authorized or unauthorized. For example, observer system 280 may cause a message to be sent to an operator of Entity B 255 inquiring whether the change was authorized. If the answer received to that inquiry is that the change was unauthorized, and/or no answer is received, observer system 280 may determine that the authoritative DNS server 250 has been compromised.

In another example, the observer system 280 may compare the IP address 260 in the DNS data 275 to a list of IP addresses associated with known malicious servers and/or websites. If the IP address contained in the A record matches one of the stored IP addresses, the observer system 280 may determine the authoritative DNS server is compromised. In yet another example, the observer system 280 may periodically compare different answers to received (similar) queries 245 and determine whether the information in those answers (e.g., the IP address 260) is the same. If the information has changed, the observer system 280 may determine the authoritative DNS server 250 and/or a zone associated with the authoritative DNS server 250 has been compromised.

In yet another example, Entity B 255 (or another associated entity) may detect or otherwise determine that the authoritative DNS server 250 has been compromised. In such an example, Entity B 255 may notify Entity A 235 that the authoritative DNS server 250 and/or zone has been compromised.

Once it is determined that the authoritative DNS server 250 has been compromised, the observer system 280 may instruct the recursive DNS resolver 230 to host a generated virtual authoritative DNS server and/or otherwise temporarily act as an authoritative DNS server.

Figure 2B:
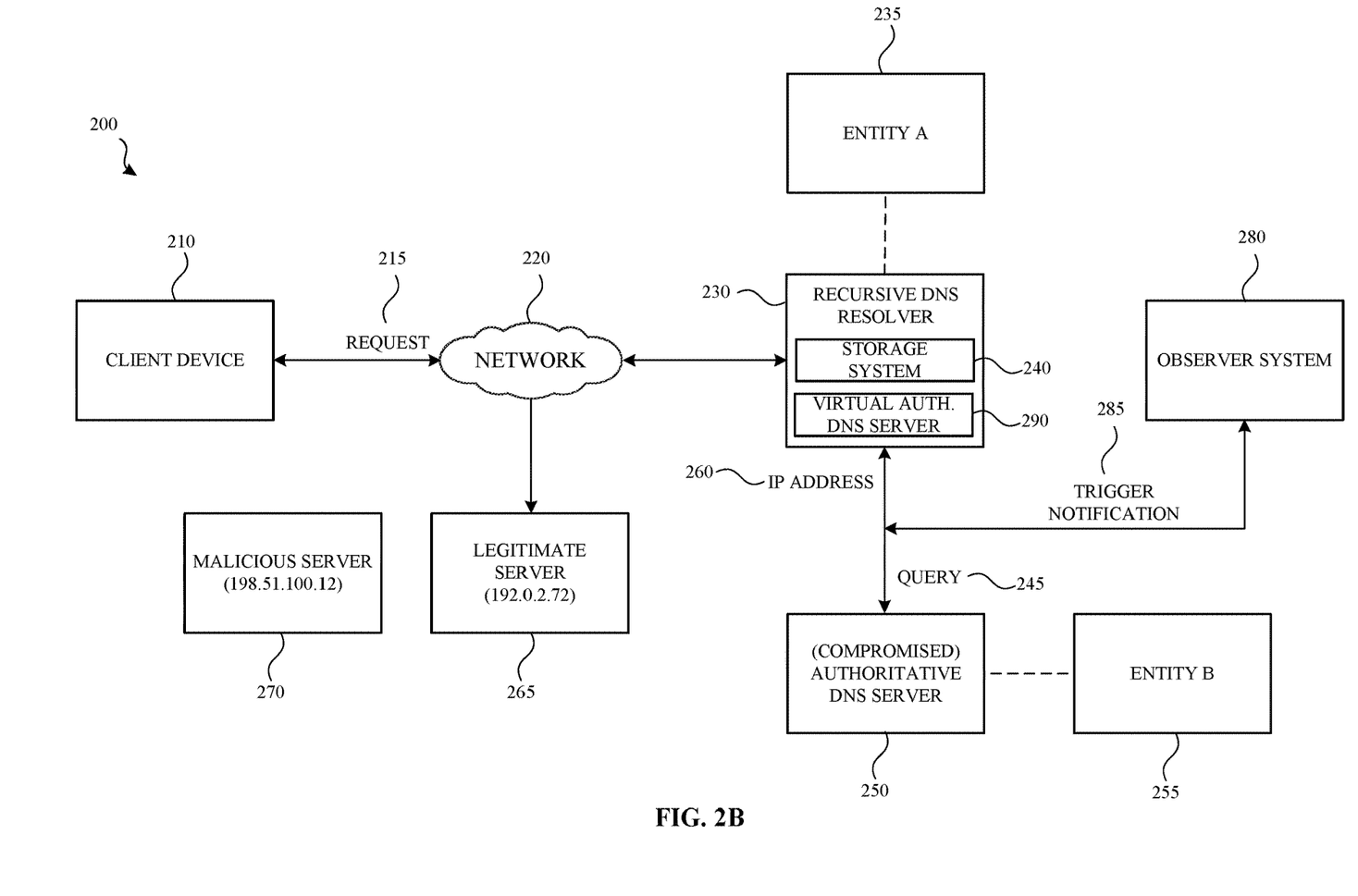
FIG. 2B illustrates the example system of FIG. 2A in which a virtual authoritative DNS server is generated according to an example.

For example and turning to FIG. 2B, FIG. 2B illustrates the example system 200 for generating a virtual authoritative DNS server 290 according to an example. In an example, the recursive DNS resolver 230 hosts the virtual authoritative DNS server 290 or otherwise acts as an authoritative DNS server 250 when it is determined the authoritative DNS server 250 has been compromised.

In another example, the recursive DNS resolver 230 hosts the virtual authoritative DNS server 290 or otherwise acts as an authoritative DNS server when it is determined that the recursive DNS resolver 230 does not have a valid cached answer (e.g., IP address 260) to a received request 215. For example, a time to live (TTL) on a cached answer associated with a compromised zone of the authoritative DNS server 250 may have expired. As such, the recursive DNS resolver 230 cannot provide a known valid IP address to the client device 210 in response to a received request 215. In another example, the recursive DNS resolver 230 may have cached or otherwise stored answers to a particular query 245 prior to the observer system 280 detecting the authoritative DNS server had been compromised. Thus, any information stored by the recursive DNS resolver may cause the client device 210 to access a malicious server 270 instead of the legitimate server 265.

Once it is determined the authoritative DNS server 250 has been compromised, the observer system 280 may provide a trigger notification 285 to the recursive DNS resolver 230. The trigger notification 285 may contain a last known valid record (e.g., A record, AAAA record, CNAME) associated with the authoritative DNS server 250 (or a zone associated with the authoritative DNS record). The trigger notification 285 may also provide instructions that causes the recursive DNS resolver to generate and/or host a virtual authoritative DNS server 290 using the information contained in the last known valid record received from the observer system 280.

In an example, the last known valid record may be based on a time parameter. For example, if the observer system 280 determines that the authoritative DNS server 250 was compromised at 12:00 PM on a given day, the observer system 280 may provide stored record information associated with the authoritative DNS server 250 that was collected at 11:00 AM on the given day. In another example, the observer system may provide record information that is collected over a number of different time periods such as, for example, an hour before the authoritative DNS server 250 was compromised, four hours before the authoritative DNS server 250 was compromised, and/or twenty-four hours before the authoritative DNS server 250 was compromised. Although specific time periods are given, these are for example purposes only.

In an example, the observer system 280 provides last known valid record information for zones that have been compromised. In such an example, the recursive DNS resolver 230 may generate and/or host a valid virtual zone that is the same or similar to the compromised zone prior to the zone being compromised. In another example, the last known valid record information may be provided for all zones associated with the compromised authoritative DNS server 250. In this example, the recursive DNS resolver 230 may host various virtual zones associated with the authoritative DNS server 250. In yet another example, the observer system 280 may provide last known valid record information for zones that are determined to be more popular (e.g., zones that are associated with more queries/requests) when compared with other zones. In an example, virtual zones for popular domains may be periodically pre-generated and stored by the observer system 280 and/or the recursive DNS resolver 230.

While the recursive DNS resolver 230 hosts the virtual authoritative DNS server 290, the recursive DNS resolver 230 may provide answers to received requests 215 without contacting the compromised authoritative DNS server 250. For example, when a request 215 for the legitimate server 265 is received from the client device 210, the recursive DNS resolver 230 may provide the appropriate IP address (e.g., 192.0.2.72) for the legitimate server 265 without querying the compromised authoritative DNS server 250 even if the DNS resolver 230 no longer has cached a DNS record received from the authoritative DNS server 250 that has a valid TTL. In examples, other recursive DNS resolvers that are controlled by Entity A 235 may be directed to recursive DNS resolver 230 as the virtual authoritative server 290 for the requested domain and/or the other recursive DNS resolvers may act as their own virtual authoritative servers (as authorized by the observer system 280). In examples, the observer system 280 may act as the authoritative DNS server and/or host one or more zones associated with the authoritative DNS server 250. In yet another example, the observer system 280 may provide information in real-time or substantially real-time to one or more recursive DNS resolvers as the one or more recursive DNS resolvers act as the authoritative DNS server and/or host one or more virtual zones.

In some examples, each DNS zone associated with an authoritative DNS server 250 includes or is otherwise associated with a public/private key pair. The public key information for a particular zone may be stored by the observer system 280. However, Entity B 255 may use a private key of a particular zone to sign DNS data and/or to generate digital signatures. The private key may only be known by Entity B 255.

However, in order to validly "sign" an answer with the private key, the recursive DNS resolver 230 must have access to and/or knowledge of the private key associated with a zone of the authoritative DNS server 250. As such, the private key may be provided to the observer system 280 (and/or Entity A 235) by the authoritative DNS server 250 (and/or by Entity B 255) and stored as a signing record. Thus, the recursive DNS resolver can use the private key to sign answers to received requests 215. In an example, the signing record is valid for a predetermined amount of time (e.g., seven days). As such, the signing record may need to be periodically renewed. In another example, the signing record is provided to the observer system 280 when a compromise is detected.

When the observer system 280 determines that the authoritative DNS server is no longer compromised or has otherwise been addressed, the virtual authoritative DNS server 250 is removed or deactivated from the recursive DNS resolver 230. In an example, the observer system 280 determines the authoritative DNS server 290 is no longer compromised in response to a notification provided by Entity B 255.

Figure 3:
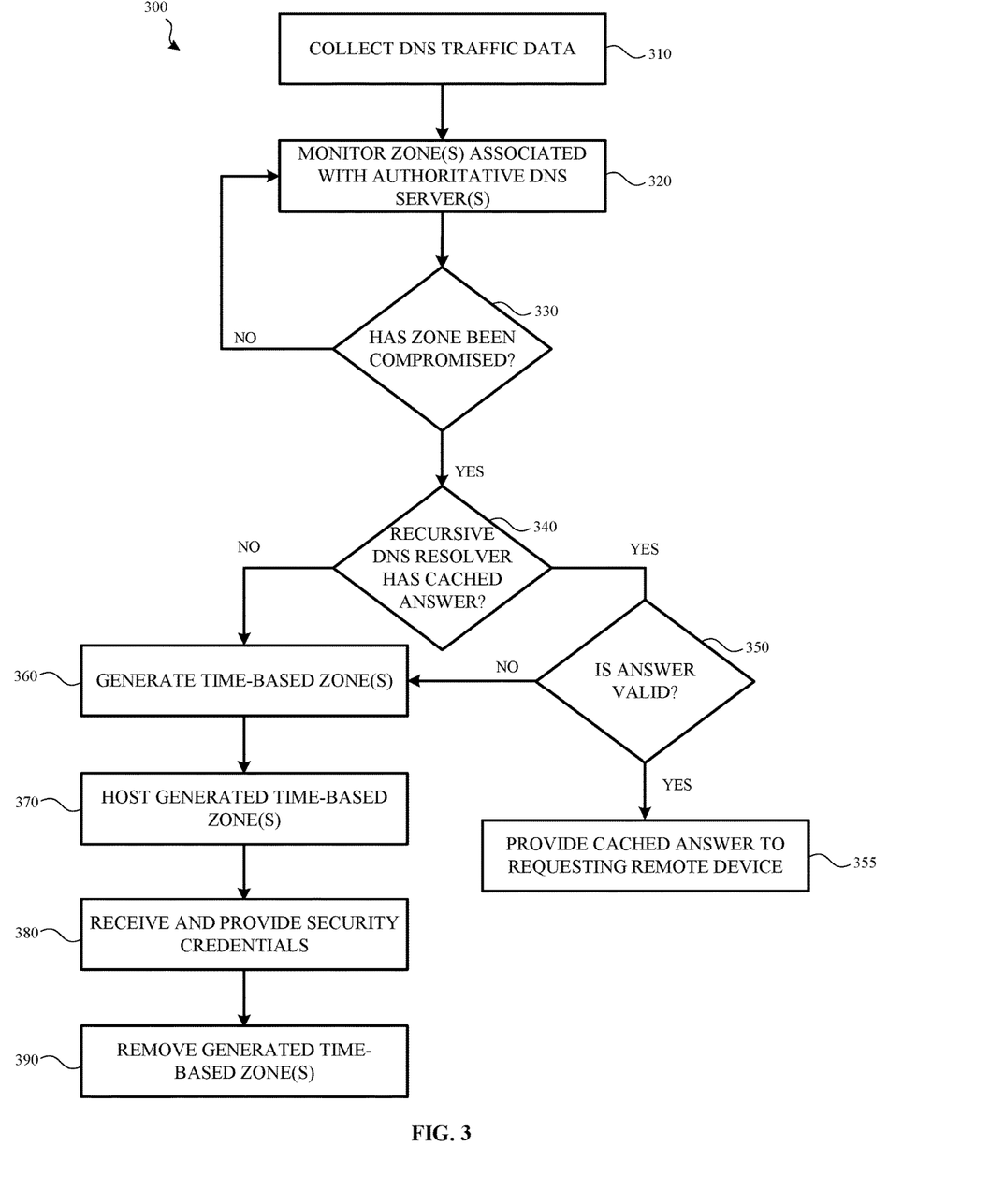
FIG. 3 illustrates a method for detecting that an authoritative DNS server has been compromised and enabling a recursive DNS resolver to direct DNS traffic that was intended for the authoritative DNS server according to an example.

FIG. 3 illustrates a method 300 for detecting that an authoritative DNS server has been compromised and enabling a recursive DNS resolver to direct DNS traffic that was intended for the authoritative DNS server according to an example. The method 300 may be performed by one or more components and/or systems described above with respect to FIG. 2A and FIG. 2B.

Method 300 begins as DNS traffic data is collected. In an example, the DNS traffic data may be passively collected (310) by an observer system associated with one or more recursive DNS resolvers. In an example, the DNS traffic data may be collected periodically or continuously. The observer system may collect the DNS traffic data as information (e.g., questions and answers associated with received requests from a client device) is passed between the one or more recursive DNS resolvers and one or more authoritative DNS servers.

For example, a recursive DNS resolver may receive a domain request from a client device. In response to the request, the recursive DNS resolver may submit a query to the authoritative DNS server. The query may be a query for an IP address associated with the domain. In response to the query, the authoritative DNS server may provide an answer in the form of a record. The record may contain information about the initial request, an origin of the request, a destination, an IP address, public key information and so on. As this information is provided from the authoritative DNS server to the recursive DNS resolver, the information is collected and/or stored by the observer system.

As the DNS traffic data is collected, the observer system may monitor (320) one or more zones associated with an authoritative DNS server in order to determine (330) whether the one or more zones (or a chain of trust between the one or more zones) has been comprised. The observer system may determine a zone has been compromised when information in a record (e.g., A record, AAAA record, CNAME) has changed when compared to a previously received record. In another example, the observer system may determine that a zone has been compromised if an IP address contained in the record points to a known malicious site/server. In yet another example, the observer system may receive a notification that one or more zones of the authoritative DNS server has been compromised. The notification may originate from an entity associated with the authoritative DNS server.

If the observer system does not determine or otherwise detect that one or more zones of the authoritative DNS server is compromised, the observer system continues to collect DNS traffic data and monitor zones. However, if a determination is made that one or more zones of the authoritative DNS server has been compromised, a determination (340) is made as to whether the recursive DNS resolver has a cached answer that enables the recursive DNS resolver to respond to a received request. If the determination is made that the recursive DNS resolver has a cached answer, a determination (350) is made as to whether the answer is valid.

For example, the observer system and/or the recursive DNS resolver may determine a time at which the authoritative DNS server was compromised. If the cached answer was received and/or stored by the recursive DNS resolver after that determined time, the cached answer may not be valid. Thus, the recursive DNS resolver does not have valid cached records that can be used to provide an appropriate response to the client device. In another example, the validity of a cached record may be based on whether the TTL associated with a record has expired.

If it is determined that the recursive DNS resolver has a valid cached record, the information (e.g., IP address) contained in the record is provided (355) to the client device in response to any received request for that record. The client device may then access the domain associated with the original request.

However, if it is determined (340) that the recursive DNS resolver does not have a valid answer stored in its cache, the observer system generates (360) one or more time-based zones using the passively collected DNS traffic data. The zones are referred to as "time-based" because the observer system may be required to determine a time at which the DNS traffic data provided by the authoritative DNS server was valid and use that information to create the virtual zone. The one or more time-based zones that are generated are intended to be used in place of the one or more compromised zones of the authoritative DNS server.

Although the method 300 shows that time-based zones are generated in response to a trigger event (e.g., a determination that a zone has been compromised and/or the recursive DNS resolver does not have a valid answer) the one or more time-based zones may be pre-generated and/or stored by the observer system. For example, the observer system may periodically generate various time-based zones for popular domains. In another example, the recursive DNS resolver may act as, or otherwise provide information associated with, a zone. For example, the recursive DNS resolver may request record information for a particular zone from the observer system and store that information in its cache. Thus, when a request is received, the recursive DNS resolver may provide a valid answer.

Once the time-based zones are generated, the time-based zones are hosted (370). In an example, the time based zones are hosted by the recursive DNS resolver. In another example, the time-based zones are hosted by the observer system. In yet another example, the recursive DNS resolver and the observer system may host different (or similar zones) or otherwise communicate with each other in order to provide answers to received queries in real-time or substantially real-time. In other examples, the zones may be hosted by a system that is separate from the recursive DNS resolver and/or the observer system. In such an example, the system, although separate from the recursive DNS resolver and/or the observer system, may be associated with and/or have the ability to communicate with the recursive DNS resolver and/or the observer system.

In an example, an answer to a received request may be associated with a public and/or private key pair. As such, the observer system may be required to receive and provide (380) security credentials associated with the zone. In an example, the security credentials may be received from an entity that is associated with the authoritative DNS server. Once the security credentials are received by the observer system, the observer system may enable the recursive DNS resolver to provide a digital signature associated with the authoritative DNS server thereby enabling the client device to access the requested domain.

When the compromised zone of the authoritative DNS server has been addressed/resolved, the observer system may cause the recursive DNS resolver to remove (390) the generated time-based zones.

Figure 4:
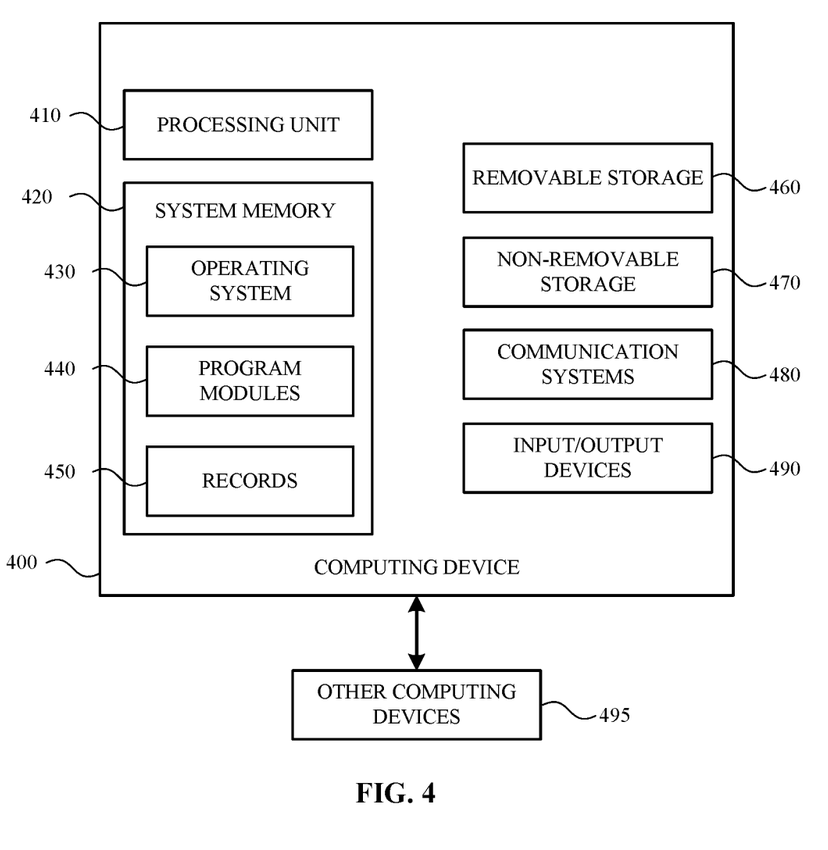
FIG. 4 is a block diagram of a computing device according to one or more examples.

FIG. 4 is a system diagram of a computing device 400 according to an example. The computing device 400, or various components and systems of the computing device 400, may be integrated or associated with a client device, an observer system, a recursive DNS resolver, or an authoritative DNS server. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering DNS data, determining discrepancies in various collected records 450 and so on. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   capturing domain name system (DNS) data;
   receiving a trigger notification, the trigger notification indicating a zone associated with an authoritative DNS server is compromised;
   causing a recursive DNS resolver to retrieve last known valid information associated with the zone from an observer system, the last known valid information being captured from the DNS data;
   generating a virtual zone using the last known valid information; and
   causing the recursive DNS resolver to host the virtual zone.

2. The method of claim 1, wherein the authoritative DNS server is associated with a first entity and the recursive DNS resolver is associated with a second entity.

3. The method of claim 1, wherein the domain name system data is passively captured by the observer system.

4. The method of claim 1, further comprising deconstructing the virtual zone when the trigger notification is resolved.

5. The method of claim 1, wherein cached information is an internet protocol (IP) address associated with the authoritative DNS server.

6. The method of claim 1, further comprising causing the virtual zone to provide a last known valid internet protocol (IP) address associated with the authoritative DNS server.

7. The method of claim 1, further comprising causing the virtual zone to provide public key data information to a requesting device.

8. The method of claim 1, further comprising enabling the recursive DNS resolver to provide private key data information to a requesting device.

* * * * *